United States Patent [19]

Izumi et al.

[11] Patent Number: 4,602,873

[45] Date of Patent: Jul. 29, 1986

[54] VIBRATION-CONTROLLING BEARING

[75] Inventors: Hideki Izumi, Tsuchiura; Nobuo Tsumaki, Ibaraki; Kazuo Ihara, Tokuyama, all of Japan

[73] Assignee: Hitachi, Ltd., Tokyo, Japan

[21] Appl. No.: 672,688

[22] Filed: Nov. 19, 1984

Related U.S. Application Data

[63] Continuation of Ser. No. 588,214, Mar. 12, 1984, abandoned, which is a continuation of Ser. No. 458,987, Jan. 18, 1983, abandoned.

[30] Foreign Application Priority Data

Feb. 26, 1982 [JP] Japan .................................. 57-29017

[51] Int. Cl.$^4$ ............................................. F16C 17/02
[52] U.S. Cl. ..................................... 384/99; 384/115; 384/118; 384/291; 384/397
[58] Field of Search ................. 384/99, 100, 107, 111, 384/114, 115, 117, 118, 215, 286, 287, 291, 397, 398; 308/DIG. 4

[56] References Cited

U.S. PATENT DOCUMENTS

| 3,517,973 | 6/1970 | Hirs | 384/115 |
| 3,756,673 | 9/1973 | Strub | 384/117 |
| 4,371,219 | 2/1983 | Yamane | 384/291 |

FOREIGN PATENT DOCUMENTS 27943  3/1977  Japan .................................. 384/398

*Primary Examiner*—Stuart S. Levy
*Assistant Examiner*—David Werner
*Attorney, Agent, or Firm*—Antonelli, Terry & Wands

[57] ABSTRACT

A vibration-controlling bearing for controlling vibration developing in a rotary shaft supported in a housing of a rotary machine including a bearing member of a cylindrical shape interposed between an outer peripheral surface of the rotary shaft and an inner peripheral surface of the housing and spaced apart therefrom by respective gaps. A dynamic pressure is generated between an inner peripheral surface of the bearing member and the outer peripheral surface of the rotary shaft. Communicating ducts are formed in the bearing member for transmitting a portion of the dynamic pressure generated to a gap between the outer peripheral surface of the bearing member and the inner peripheral surface of the housing.

9 Claims, 4 Drawing Figures

F I G. 1
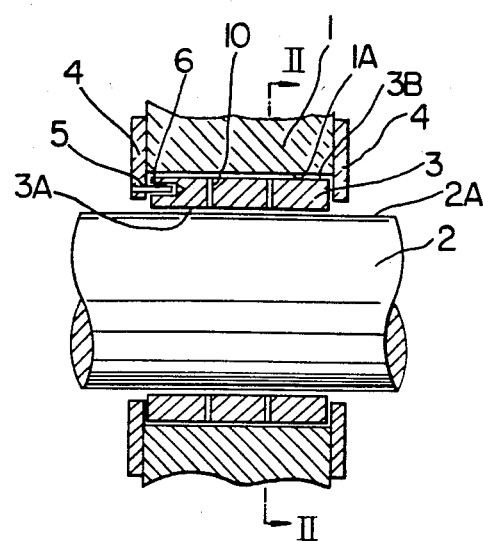
F I G. 2
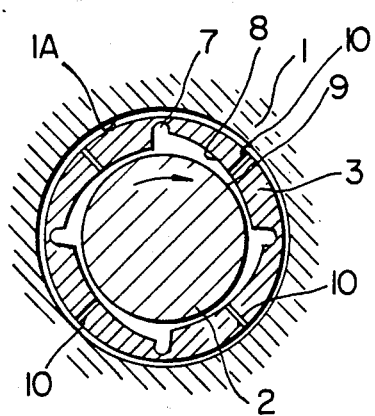

VIBRATION-CONTROLLING BEARING

This is a continuation of application Ser. No. 588,214, now abandoned, filed Mar. 12, 1984, which is a continuation of Ser. No. 458,987, filed Jan 18, 1983, now abandoned.

BACKGROUND OF THE INVENTION

1. Field of the Invention

This invention relates to vibration-controlling bearings having high vibration damping capabilities, and, more particularly, to a vibration-controlling bearing suitable for use as a low-load bearing for a rotary machine of the compact size and high speed rotation type having a bearing surface lubricated by a fluid filled around the bearing.

2. Description of the Prior Art

Generally, in a slide bearing lubricated by a fluid, a film of fluid, formed in a gap between the bearing surface and the rotary shaft, as the rotary shaft rotates, excites the shaft at high speed rotation, thereby causing unstable vibration generally referred to as a whirl to be produced. Various proposals have been made to use different types of slide bearing to suppress the unstable vibration, and some of them have been put to practical use.

Typical of the known vibration-controlling bearings include a tilting pad bearing and a damper bearing such as disclosed, for example, in Japanese patent publication No. 22607/78. This type of bearing has a construction essentially enabling the exciting action of a fluid film to be eliminated, so that the difficulty of unstable vibration sets in until rotation of the shaft reaches a high speed range. However, it suffers the disadvantages that the construction is complex and the cost is high. A damper bearing has been developed for the purpose of obviating the disadvantages of the tilting pad bearing which is essentially constructed in a manner to softly mount a radial slide bearing member in a housing through support means having a spring action and a damping action. The support means of this type has the function of alleviating and absorbing a force tending to excite a fluid film formed between the shaft and the bearing member, so that unstable vibration can be prevented from developing in the shaft until rotation of the shaft reaches a high speed rotation range. The support means of this type comprising a spring, such as a coil spring or plate spring, and a damper, including a viscous fluid located on the outer periphery of the bearing member and in the gap between the housing and the bearing member, has been put to practical use in some type of machines. However, like the tilting pad bearing, the damper bearing is also complex in construction and high in cost, so that its use is limited. Meanwhile a floating bush bearing is available which, although it is one type of damper bearing, is relatively simple in construction and low in cost. The floating bush, bearing comprises a bush of the cylindrical shape and having a plurality of radial oil feed openings, loosely fitted between the shaft and the housing for receiving a supply of fluid from outside fluid feeding means into a gap between the inner surface of the bush and the shaft and a gap between the outer surface of the bush and the housing for lubrication, so that the bush can be rotated by the viscous resistance of the lubricating fluid on the inner surface of the bush as the shaft rotates to thereby form a lubricating film of fluid between the outer surface of the bush and the housing. The lubricating film of fluid on the outer surface of the bush has both the spring action and the damping action, so that it is capable of alleviating and absorbing a force tending to excite the film of fluid on the inner surface of the bush. This type of bearing has been put to practical use as a high-speed bearing of relatively low load, such as a bearing used with a turbo supercharger. In actual practice, however, this type of bearing suffers the disadvantage that stable rotation of the bush is unobtainable. Thus, formation of a fluid film on the outer surface of the bush does not occur in a stable manner, with the result being that it is not possible to completely suppress unstable vibration of the shaft. Particularly when the lubricating fluid used is a low-viscosity fluid, such as water or gas, it is practically impossible to achieve stable rotation of the bush because a rotary force developing from the viscous resistance of the fluid film acting on the inner side of the bush is low. This defect would be considered fatal from the point of view of maintaining reliability of the machine.

SUMMARY OF THE INVENTION

An object of this invention is to provide a vibration-controlling bearing capable of stable operation with a lubricating fluid of low viscosity.

Another object is to provide a vibration-controlling bearing capable of being readily fabricated and assembled.

Still object is to provide a vibration-controlling bearing capable of readily maintaining a high degree of dimensional precision and accuracy after being assembled.

To accomplish the aforesaid objects, there is provided a vibration-controlling bearing capable of controlling vibration developing in a rotary shaft supported in a housing of a rotary machine comprising a bearing member interposed between an outer peripheral surface of the rotary shaft and an inner peripheral surface of the housing and spaced apart therefrom by respective gaps, with dynamic pressure generating means being mounted on one of an inner peripheral surface of the bearing member and the outer peripheral surface of the rotary shaft for generating dynamic pressure between an inner peripheral surface of the bearing member and the outer peripheral surface of the rotary shaft, communicating ducts are formed in the bearing member for transmitting a portion of the dynamic pressure generated by the dynamic pressure generating means to a gap between the outer peripheral surface of the bearing member and the inner peripheral surface of the housing.

Additional and other objects, features and advantages of the invention will become apparent from the description set forth hereinafter when considered in conjunction with the accompanying drawings.

BRIEF DESCRIPTION OF THE DRAWINGS

FIG. 1 is a vertical cross-sectional view of the vibration-controlling bearing in accordance with an embodiment of the invention;

FIG. 2 is a cross-sectional view taken along the line II—II of FIG. 1;

DESCRIPTION OF THE PREFERRED EMBODIMENTS

Figure 3:
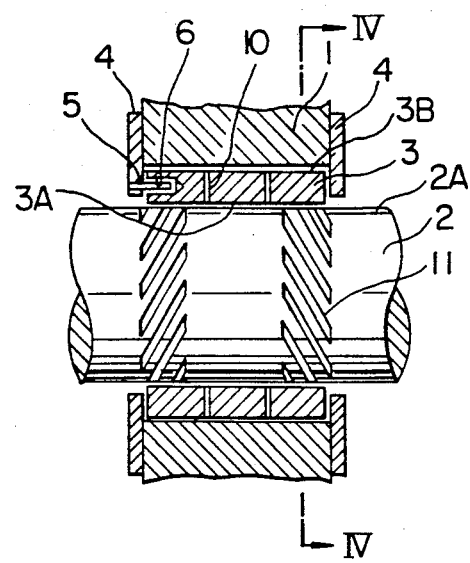
FIG. 3 is a vertical cross-sectional view of the vibration-controlling bearing in accordance with another embodiment.

As shown in FIGS. 1 and 2, a vibration-controlling bearing includes a housing 1 and a shaft 2, with cylindrical shaped bearing member 3 being mounted between an inner peripheral surface 1A of the housing 1 and an outer peripheral surface 2A of the shaft 2. The bearing member 3 has a bearing surface 3A on its inner periphery and an outer peripheral surface 3B located in spaced-apart juxtaposed relation to the outer peripheral surface 2A of the shaft 2 and the inner peripheral surface 1A of the housing 1 respectively. The housing 1, has positioning plates 4 secured to respective ends thereof restraining the bearing member 3 from excessive axial movement. One of the positioning plates 4 has secured thereto a rotation stop pin 5 engaged in a hole 6 formed at one end of the bearing member 3 to prevent rotation of the latter peripherally thereof so long as the movement thereof in a radial direction is not interfered with or so long as the bearing member 3 is capable of controlling vibration. The bearing surface 3A of the bearing member 3 is provided with means for generating a wedge pressure which comprises, in this embodiment, four axially extending grooves 7, and four sectors of the bearing member 3 divided by the axial grooves 7. The four sectors each comprise an inclined surface 8 which becomes nearer to the outer peripheral surface 2A of the shaft 2 in going from the axial groove 7 in the direction of rotation of the shaft 2, and a land surface 9. By virtue of the provision of the inclined surfaces 8 and the land surfaces 9, the rotation of the shaft 7 produces, between the bearing surface 3A of the bearing member 3 and the outer peripheral surface 2A of the shaft 2, a lubricating film of fluid having a dynamic wedge pressure. The bearing member 3 is formed with a plurality of communicating ducts 10 each associated with one of the sectors of the bearing member 3 and opening at one end on the bearing surface 3A of the bearing member 3 and at the other end on the outer peripheral surface 3B thereof. The communicating ducts 10 have the function of leading a portion of the pressure of the fluid generated by the wedge pressure generating means to the gap between the outer peripheral surface 3A of the bearing member 3 and the inner peripheral surface 1A of the housing 1. The position in which each communicating duct 10 opens on the bearing surface 3A is preferably selected such that the pressure of the lubricating film of the fluid is maximized in such position to enable the bearing member 3 to effectively perform its vibration control function. To this end, in this embodiment, each communicating duct 10 opens in the boundary between the inclined surface 8 and the land surface 9 of each sector of the bearing member 3.

Operation of the embodiment of FIGS. 1 and 2 is as follows. Assume that the shaft 2 rotates in the direction of an arrow shown in FIG. 2. The rotation of the shaft 2 causes a lubricating fluid in the periphery of the bearing member 3 to be drawn through the axial grooves 7 to a wedge-shaped gap defined between each inclined surface 8 and the outer peripheral surface 2A of the shaft 2. The pressure of the lubricating fluid is raised by the wedge-shaped film effect, so that the lubricating fluid of high pressure acts as a lubricating film of the fluid of high pressure between the bearing surface 3A of the bearing member 3 and the outer peripheral surface 2A of the shaft 2.

A portion of the lubricating fluid having its pressure raised between the bearing surface 3A of the bearing member 3 and the outer peripheral surface 2A of the shaft 2 flows along the land surfaces 9 into the axial grooves 7, and another portion thereof flows through the communicating ducts 10 into the gap between the outer peripheral surface 3B of the bearing member 3 and the inner peripheral surface 1A of the housing 1. The fluid has pressure generated by the wedge-shaped film effect, so that a lubricating film of the fluid is formed in the gap by the static bearing action before the fluid is released from the bearing.

The film of fluid formed in the gap between the outer peripheral surface 3B of the bearing member 3 and the inner peripheral surface 1A of the housing 1 has both a spring action and a damping action and is capable of alleviating and absorbing a vibration generating force of the lubricating film of the fluid on the bearing surface 3A of the bearing member 3. By virtue of this feature, no unstable vibration occurs in the shaft 2 when the rotary machine is used into a high speed rotation range. Moreover, the lubricating film of the fluid formed on the outer peripheral surface 3B of the bearing member 3 has a function such that in the bearing according to the invention, a lubricating fluid of high pressure on the bearing surface 3A of the bearing member 3 is led to the gap between the outer peripheral surface 3B of the bearing member 3 and the inner peripheral surface 1A of the housing 1 to form a film of fluid in this gap. This eliminates the need to rotate the bearing member as is the case with a floating bush bearing of the prior art, and, even if the lubricating fluid used has low viscosity such as, for example a gas, it is possible to provide a lubricating film of the fluid capable of performing a stable vibration control function in a satisfactory manner.

Figure 4:
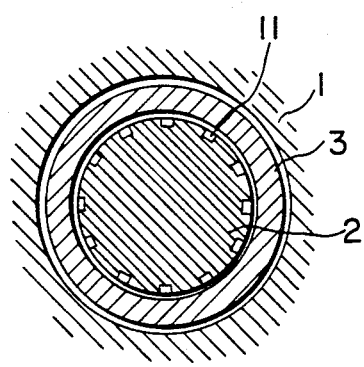
FIG. 4 is a cross-sectional view taken along the line IV—IV of FIG. 3.

In the embodiment of FIGS. 1 and 2, the wedge pressure producing means comprises the inclined surfaces 8 and the land surfaces 9 formed on the bearing surface 3A of the bearing member 3. However, as shown in FIGS. 3 and 4, the wedge pressure producing means may comprise a plurality of spiral grooves 11 located on the outer peripheral surface 2A of the shaft 2 obliquely with respect to the axis of the shaft 2 so as to form a lubricating film of fluid of high pressure by the spiral grooves 11. Alternatively, the grooves 11 may be formed on the bearing surface 3A of the bearing member 3. The invention is not limited to this specific form of the grooves 11 described hereinabove and the grooves 11 may have any shape and configuration so long as they are capable of forming a lubricating film of fluid of high pressure on the bearing surface 3A of the bearing member 3 even if the shaft 2 and the bearing member 3 are maintained in coaxial positional relationship. The bearing according to the invention can have application in any shaft system where control of vibration is necessary. It has particular utility in a shaft system of a rotary machine of high-speed rotation and compact size which has a low load. In the bearing according to the invention, a fluid of high viscosity, such as oil, and a fluid of low viscosity, such as gas, can be used. The bearing according to the invention can be used with a rotary shaft of the vertical type as well as the horizontal type. When the shaft is of the vertical type, it is advantageous, to reduce frictional dragging of the shaft on the lower end face of the bearing member, to supply to the lower end face of the bearing member through passages formed in the latter a portion of the dynamic pressure produced in a gap between the bearing body and the shaft.

From the foregoing description, it will be appreciated that the vibration-controlling bearing according to the invention is simple in construction and low in cost, and yet it is capable of suppressing unstable vibration effectively that might be produced in a high-speed rotation range of a shaft even if the lubricating fluid used is low in viscosity.

What is claimed is:

1. A vibration-controlling gas bearing for controlling vibration developing in a rotary shaft supported in a housing of a rotary machine, the vibration-controlling gas bearing comprising:
   a cylindrical bearing member interposed between an outer peripheral surface of the rotary shaft and an inner peripheral surface of the housing and spaced apart therefrom by respective gaps;
   dynamic pressure generating means provided on an inner peripheral surface of the bearing member for generating dynamic pressure between an inner peripheral surface of the bearing member and the outer peripheral surface of the rotary shaft;
   rotation stop means comprising a hole formed in one axial end face of said bearing member, and a pin engaging in said hole and attached to said housing for preventing rotation of the bearing member in such a manner so as to allow the bearing member to be slightly moved in a radial direction;
   wherein said dynamic pressure generating means comprises at least one bearing member to define a wedge-shaped gap between the inner peripheral surface of the bearing member and the outer peripheral surface of the rotary shaft; and
   communicating ducts formed in the bearing member for transmitting a portion of the dynamic pressure generated by the dynamic pressure generating means to a gap between the outer peripheral surface of the bearing member and the inner peripheral surface of the housing.

2. A vibration-controlling bearing capable of controlling vibration developing in a rotary shaft supported in a housing of a rotary machine, comprising:
   a cylindrical bearing member interposed between an outer peripheral surface of the rotary shaft and an inner surface of the housing and spaced apart therefrom by respective gaps;
   dynamic pressure generating means mounted on one of an inner peripheral surface of the bearing member and an outer peripheral surface of the rotary shaft for generating dynamic pressure between an inner peripheral surface of the bearing member and an outer peripheral surface of the rotary shaft;
   communicating ducts formed in the bearing member for transmitting a portion of the dynamic pressure generated by the dynamic pressure generating means to a gap between the outer peripheral surface of the bearing member and the inner peripheral surface of the housing;
   rotation stop means comprising a hole formed in one axial end face of said bearing member, and a pin engaging in said hole and attached to said housing for preventing rotation of the bearing member in such a manner so as to allow the bearing member to be slightly moved in a radial direction; and
   wherein said dynamic pressure generating means comprises grooves formed on the outer peripheral surface of the rotary shaft located in spaced-apart relationship with respect to one another.

3. A vibration-controlling bearing as claimed in claim 2, wherein said grooves comprise spiral grooves located on the outer peripheral surface of said rotary shaft in a symmetrical relationship with respect to a plane extending perpendicular to a center axis of the rotary shaft.

4. A vibration-controlling bearing as claimed in any one of claims 2 or 3, wherein first ends of each of said communicating ducts opens in the inner peripheral surface of the bearing member at a position in which the dynamic pressure generated is maximized.

5. A vibration-controlling bearing as claimed in claim 4, wherein said bearing member is located between a horizontally arranged rotary shaft and the housing is juxtaposed theregainst.

6. A vibration-controlling bearing as claimed in claim 4, wherein said bearing member is located between a vertically disposed rotary shaft and the housing is juxtaposed thereagainst.

7. A vibration-controlling bearing as claimed in claim 4, wherein said communicating ducts are disposed in a circumferentially spaced relationship with respect to one another.

8. A vibration-controlling bearing as claimed in claim 4, wherein said communicating ducts are arranged in circumferential rows spaced from each other in an axial direction of the bearing member, and wherein said communicating ducts in each of the circumferential rows are circumferentially spaced from one another.

9. A vibration-controlling gas bearing for controlling vibration developing in a rotary shaft supported in a housing of the rotary machine, the vibration controlling gas bearing comprising:
   a cylindrical bearing member interposed between an outer peripheral surface of the rotary shaft and an inner peripheral surface of the housing with gaps being respectively defined between an inner peripheral surface of the bearing member and an outer peripheral surface of the housing and between an outer peripheral surface of the bearing member and an inner peripheral surface of the housing;
   dynamic pressure generating means provided on the inner peripheral surface of the bearing member for generating dynamaic pressure between the inner peripheral surface of the bearing member and the outer peripheral surface of the rotary shaft; and
   a plurality of communicating ducts extending radially through the bearing member, each of said communicating ducts having a first end opening in the inner peripheral surface of the bearing member and a second end opening in the outer peripheral surface of the bearing member for supplying a portion of the dynamic pressure generated by the dynamic pressure generating means into the gap between the outer peripheral surface of the bearing member and the inner peripheral surface of the housing.

* * * * *